Patented Aug. 6, 1929.

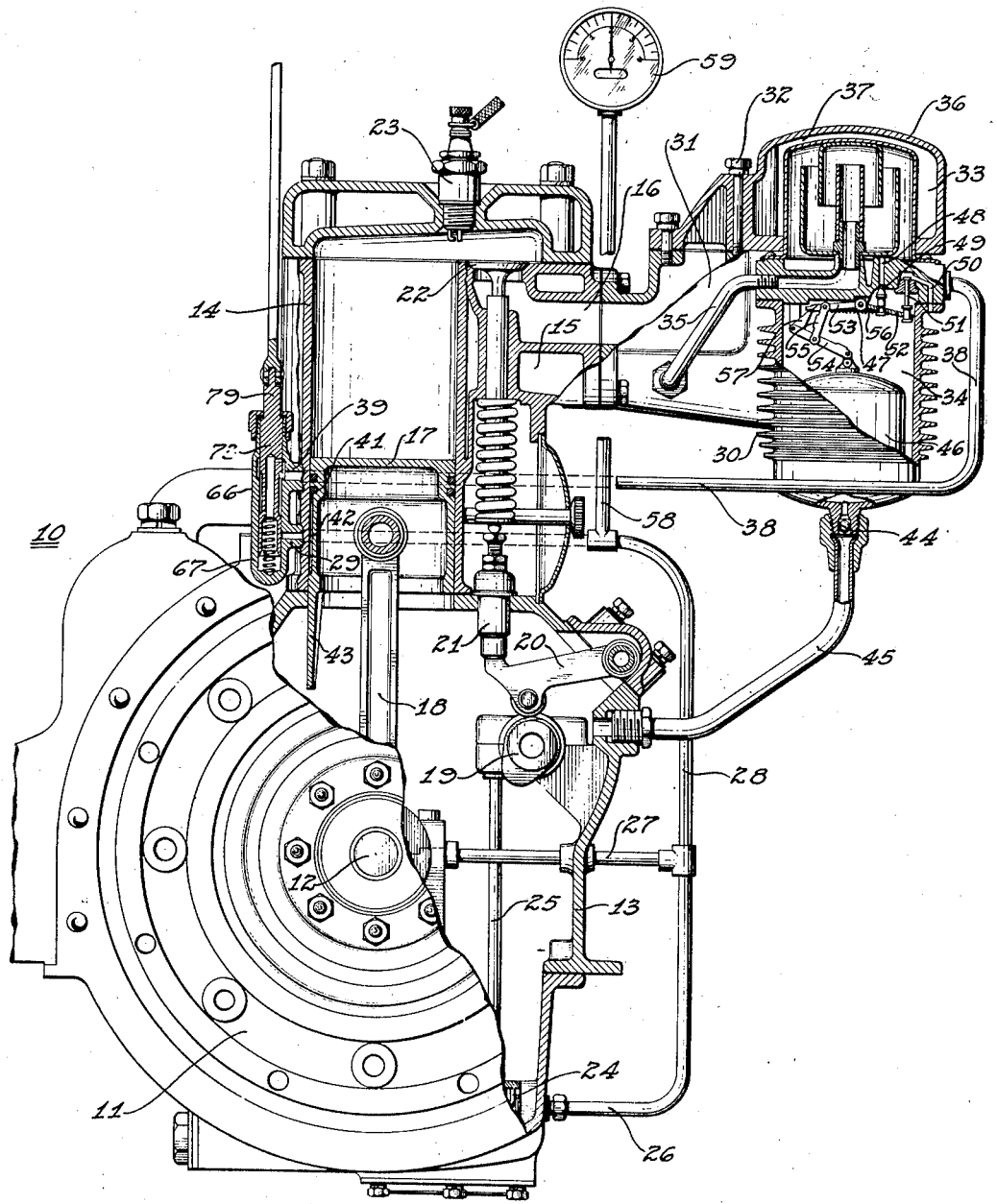

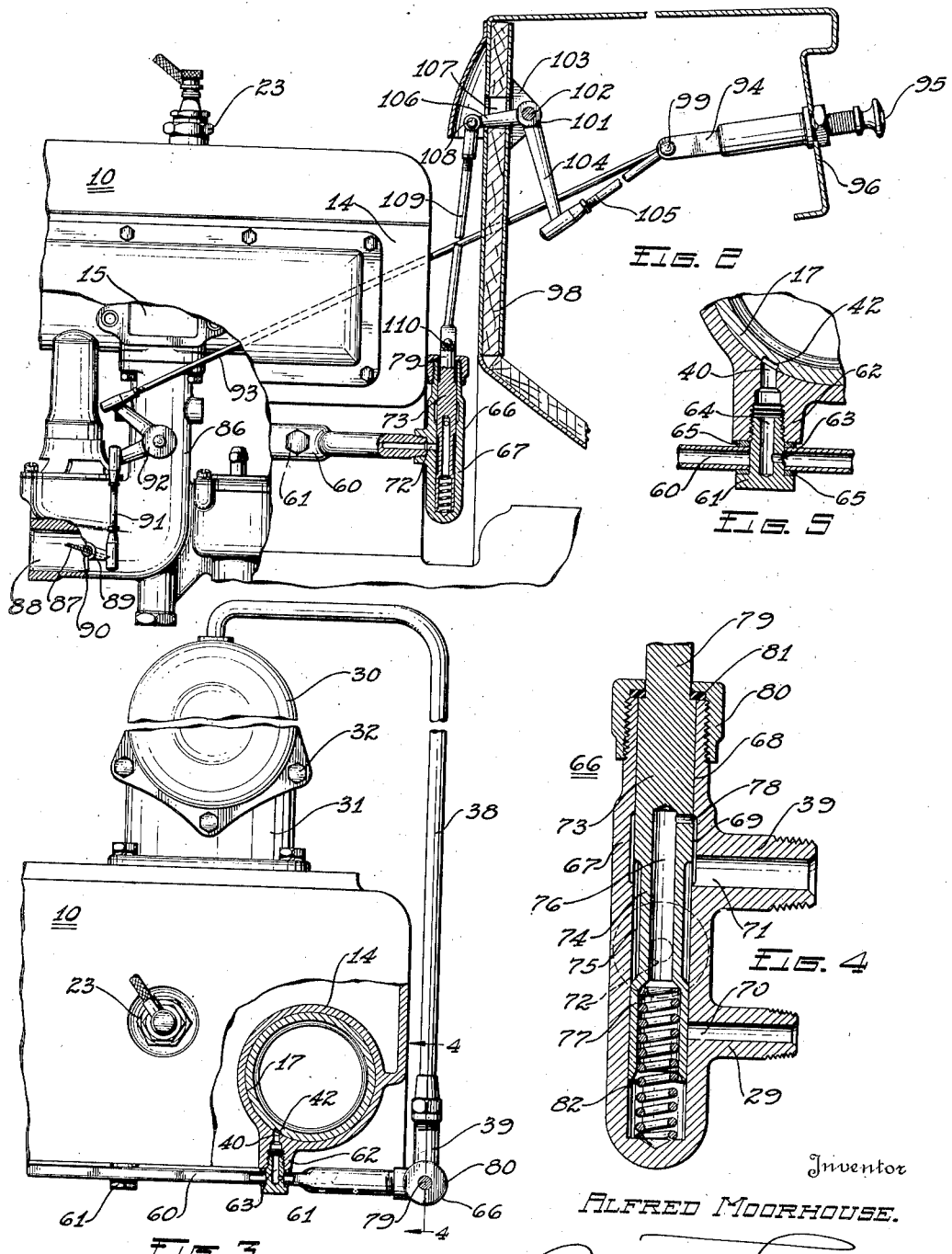

1,723,947

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed November 25, 1927. Serial No. 235,546.

This invention relates to internal combustion engines and particularly to the lubrication system thereof.

Internal combustion engines are provided with a pressure lubricating system in which oil is drawn from the crankcase and fed to the various bearing surfaces of the engine under pressure, the oil dripping from the bearing surfaces back into the crankcase and being recirculated. Engines are also provided with various forms of purifying means for the lubricant, and one of these forms of purifying means is a rectifier or oil still which withdraws by suction some of the lubricant from a lubricated part of the engine and distills off the lighter parts of the oil, the purified oil being returned to the engine crankcase. Sometimes engines are supplied with lubricant directly to the cylinder walls, but if this is done constantly during the operation of the engine, there is usually a considerable waste of oil and smoking of the engine. In cold weather it is found that when an engine is started there is insufficient lubrication to the cylinder walls due to the fact that the oil is slow in reaching the cylinder walls from the crankshaft bearings unless oil is fed directly to the cylinder walls. This first movement of the pistons against the cylinder walls with insufficient lubrication during the starting of the engine, particularly in cold weather, is found to scuff or score the pistons or cylinder walls.

One of the objects of the present invention is to provide means for lubricating the cylinder walls directly from the oil pressure system during the starting of the engine from cold, and to do this through the cylinder connection provided for the oil purifying means.

Another object of the invention is to provide means whereby the operator may temporarily connect the oil pressure means to the cylinder walls of the engine to protect such walls and the pistons during the starting of a cold engine.

Another object of the invention is to provide means for initially lubricating the cylinder walls and pistons of an engine from the oil pressure means thereof, the lubrication being under the manual control of the operator and co-incident with and in conjunction with other operations performed by the operator when starting the engine from cold.

Another object of the invention is to provide pressure cylinder lubricator means in which the flow of oil from the cylinder may be temporarily reversed by the engine operator to lubricate the pistons and cylinder walls upon starting the engine from cold.

Other objects of the invention will appear from the following description taken in connection with the drawings, which form a part of this specification, and in which:

Fig. 1 is a transverse sectional view through an internal combustion engine embodying the invention;

Fig. 2 is a side elevation of part of the engine illustrated in Fig. 1, partly broken away and partly in section for better illustration, showing the control valve in one of its positions;

Fig. 3 is a view of part of the engine shown in Figs. 1 and 2, partially in plan and partially broken away and in section through the cylinder wall conduit;

Fig. 4 is an enlarged detail section showing the control valve in its "vacuum" position, substantially on the line 4—4 of Fig. 3, and Fig. 5 is an enlarged sectional detail of the cylinder connection.

Referring to the drawings, 10 represents an internal combustion engine comprising the conventional parts as follows: fly wheel 11, crankshaft 12 mounted in a crankcase 13, a cylinder block 14 supported on the crankcase, an intake passage 15, an exhaust passage 16, a piston 17 sliding in the cylinder, a connecting rod 18 extending from the piston to the crankshaft, a cam shaft 19 driven by two-to-one gearings from the crankshaft, rocker arms 20 operated by the cam shaft, push rods 21, valves 22, and spark plugs 23 for igniting the charge in the cylinder. Preferably mounted in the bottom of the crankcase is an oil pump 24 driven by a shaft 25 by suitable worm gearing on the camshaft 19, and an oil pipe 26 leads from the oil pump to pipe 27 which may be connected with the main and other bearings of the crankshaft for lubricating the latter under pressure. Oil is thrown from the crankshaft bearings to the cylinder walls for lubricating the latter in the usual operation of the engine. A pipe 28 leads from the pipe 26 to a connection 29 which will be hereinafter more particularly referred to.

An oil purifying means in the form of a rectifier or still is indicated generally at 30. This is suitably mounted on the engine as by connecting it to the exhaust manifold 31 which forms a continuation of the exhaust conduit 16 above referred to. Suitable bolts 32 are the connecting means.

The oil rectifier consists of a tank with two separate compartments 33 and 34. The top compartment is connected to the intake manifold of the engine as through a pipe 35 and is thereby subject to the same vacuum or depression as exists in the intake conduit. This upper compartment 33 is surrounded by a jacket or casing 36 which is connected as at 37 to the exhaust manifold 31 so that the heat from the exhaust heats the upper compartment 33. Another connection to this compartment 33 is in the form of a pipe 38, leading to a connection 39 which will be also hereinafter referred to. A conduit 40 is provided in each of the cylinder walls, as best shown in Fig. 3, and this conduit is always sealed by the piston except that it may draw off the surplus oil from one of the piston ring grooves as at 41. There is a longitudinal groove 42 in the piston for keeping the conduit 40 in communication with the piston ring groove during part of the upstroke of the piston. An extension 43 on the lower end of the piston 17 covers the conduit 40 during the remainder of the up stroke of the piston. The conduits 40 of the various cylinders are adapted to be connected alternatively to the pipes or connections 28 and 39 through control means hereinafter more particularly described.

The lower compartment 34 of the oil rectifier is connected through a valve 44 and a pipe 45 with the crankcase 13, and there is a valve mechanism between the compartments 33 and 34 operated by a float 46, which controls the passage of refined oil from the compartment 33 to the compartment 34, and the subsequent passage from the latter compartment through the pipe 45 to the crankcase 13. This valve mechanism is of conventional construction and is indicated generally by the numeral 47.

Assuming that the engine is in operation and that there is an operative connection between the pipe 38 and the conduits 40, the depression existing in the intake conduit 15 results in the drawing off of surplus oil from the cylinder wall through the conduit 40 and pipe 38 into the compartment 33. Some of this oil contains impurities and unburned fuel which is detrimental to the lubrication system of the engine. When the diluted oil reaches the compartment 33 of the rectifier, the fuel and water is distilled off by the heat of the manifold 31, the distillate passing through the pipe 35 to the intake conduit 15 of the engine and there becoming a part of the mixture passing into the engine cylinders. The rectified oil passes by gravity from the compartment 33, through the opening controlled by the valve operated by the float mechanism into the lower compartment 34, and then when the level therein reaches a predetermined point the float operates the valve mechanism, and vents the lower compartment 34 thus permitting the oil therein to flow by gravity through the pipe 45 into the crankcase 13. This process of distilling the fuel and water from the oil is continuous during the operation of the engine and as long as the pipe 38 is connected to the conduit 40.

Referring to the specific valve mechanism shown and indicated at 47, there is a port 48 between compartments 33 and 34, which port is controlled by a valve 49, there is a vent port 50 controlled by a valve 51, there is a pivoted arm 52 which is adapted to move the valves 49 and 51, there is a pivoted arm 53, and there is a pivoted arm 54 and a link 55 connecting the arms 53 and 54. A spring 56 connects the outer ends of the arms 52 and 53 for snapping the arms over dead center as the float moves the arm 53. A stop 57 limits the upper and lower positions of the float 46. It can be seen that when the float is in its lower position as shown, the valve 49 leaves the port 48 open so that the suction of the compartment 33 is conveyed to the compartment 34 and the valve 44 is retained in a closed position. Also, the valve 51 closes the vent 50 so that this condition of partial vacuum may exist. When the float 46 is moved to its upper position by the compartment 34 filling up with oil, the arms 52 and 53 are snapped over dead center and the valve 49 closes the port 48 and the vent 50 is opened and thereby the compartment 34 is sealed from the compartment 33, and the compartment 34 is vented so that the valve 44 will drop and permit the charge of oil to flow by gravity into the crankcase 13. This movement of the oil causes the float to drop and return to its initial position and the cycle is repeated.

Connected to the previously described pressure pipe 28, through a pipe 58, is a pressure gage 59 so that the pressure of the oil in the lubricating system is always indicated by the gage. This gage may be located in any suitable position, the pipe 58 being extended accordingly, and it is ordinarily convenient to place it for direct observation by the operator of the engine, or the driver of a motor vehicle when the engine is mounted on such a vehicle.

Secured to the side of the cylinder block is an oil conducting manifold 60, preferably of substantially rectangular cross section, which forms part of the means for connecting the conduits 40 of the various cylinders to the pressure pipe 28 and to the suction pipe 38. The connection between each of the conduits 40 and the manifold is effected, in the embodiment illustrated, by a hollow bolt or cap screw 61 threaded into a boss 62 formed on the side of the cylinder wall 14. The bolts 61 pass through both sides of the manifold 60 and secure it to the cylinder wall, and communication is afforded from the conduit 40 to the manifold through the passages 63 and 64 formed in the bolts 61. Suitable gaskets 65 may be placed between the bolt and the manifold, and between the manifold and the boss 62, to prevent leakage. The rearward end of the manifold 60 may terminate in a portion of circular section as desired.

Arranged at the junction of the pipes 28 and 38 and the manifold 60, all of which have been hereinbefore described, is a control valve mechanism indicated generally at 66, which is shown in enlarged section for better illustration, in Fig. 4. This comprises a valve casing 67 having a substantially cylindrical chamber 68 provided with an annular chamber 69 of larger diameter. The connections 29 and 39, of the pipes 28 and 38 respectively, communicate with the chamber 68 through ports 70 and 71, which lead into the annular chamber 69 as shown. The manifold 60 communicates with the chamber 68 through a port 72, which is arranged between the ports 70 and 71 and at right angles thereto.

Slidably mounted in the chamber 68 is a valve element or piston 73 having an intermediate portion 74 of reduced diameter, forming an annular port 75, and also formed with a central bore or chamber 76, the lower end of which is enlarged as shown at 77. The chamber 76 is provided with a radially disposed port 78 near its upper end, which in some positions of the piston 73 communicates with the annular chamber 69. The upper end of the piston 73 has a stem 79 which extends through a cap 80 on the valve casing 67, where it is provided with suitable packing 81 to prevent leakage. The lower end of the piston is engaged by a spring 82 arranged in the closed end of the chamber 68, which spring urges the piston upwardly. The stem 79 is connected to and actuated by suitable control mechanism presently to be described. It is the purpose of this valve mechanism to connect either the pipe 28 or the pipe 38 to the manifold 60.

Thus when the valve piston 73 is in its uppermost position, as illustrated in Fig. 4, the rectifier suction pipe 38 is connected to the manifold 60 directly through the annular port 75, with which the port 72 also communicates, and therefore the rectifier 30 is operatively connected to the piston ring grooves 41 through the manifold 60, the ports in the hollow bolt 61 and the port 40. In this position of the piston valve the port 70 is shut off by the enlarged lower end of the piston 73, so that oil under pressure from the engine lubricating system is not admitted to the manifold 60. Any of this oil which should leak past the piston valve 73 must of necessity pass into the annular port 75 and is drawn by the suction of the rectifier through the port 71 and into the pipe 38.

When the valve piston 73 is in its lowermost position, as illustrated in Fig. 2, the port 71 is closed by the upper portion of the piston 73 and the annular port 75 is in communication with the port 70. Thus oil under pressure from the lubricating system is admitted from the pipe 28 to the chamber 75 and thence directly through the port 72 to the manifold 60. This oil is then delivered through the passages 63 and 64 to the conduits 40, and thence to the cylinder walls. Any oil leaking past the lower end of the piston 73 will pass through the hollow interior 76 of the piston valve, and the port 78, into the annular chamber 69 and thence through the port 71 into the suction pipe 38. Thus in either position of the control valve, any oil leakage from the pressure system of the engine is drawn into the rectifier and thence returned to the system.

The intake manifold 15 of the engine is supplied with fuel mixture from any suitable charge forming device, such as the carbureter 86, which is adapted to carburet air drawn through it by the suction of the engine in the well known manner. To facilitate starting of the engine from cold it is provided with a manually operated choke or starting device, which is adapted to restrict the admission of air to the carbureter, so as to increase the richness of the fuel mixture supplied to the engine. Such devices are well known in the art to which this invention relates, and in the embodiment illustrated the starting device comprises a butterfly valve 87 placed in an air intake passage 88 of the carbureter 86, and adapted to close or partially close this passage. By throttling or choking the passage of air through the intake 88 the richness of the fuel mixture is increased in the well known manner to facilitate the starting of the engine. To secure easy manipulation of the valve 87, it is arranged for manual control by the operator of the engine or the driver of the vehicle on which the engine is mounted.

As clearly shown in Fig. 2, this control mechanism comprises a lever 89 connected to the extended shaft 90 of the valve 87, and actuated through a suitable link 91 and a bell-crank lever 92 by a pull rod 93, which is in turn connected to a slidable rod 94, terminating in a handle 95 within easy reach of the operator. This rod 94 is conveniently mounted upon the instrument board 96 of the engine. In the present embodiment the pull rod 93 passes through an opening 97 in a supporting panel or dash 98 and is connected to the end of the slide 94 as by a pin 99. Upon starting the engine from cold, when adequate lubrication of the pistons is most needed, the valve means 66 is controlled simultaneously with the choke or starting valve to supply oil to the cylinder wall.

To this end a bell-crank lever 101 is pivotally mounted as at 102 upon a suitable bracket 103 on the dash 98, and one arm 104 of this lever is connected to the pivot pin 99 by an adjustable link 105. The other arm 106 of the bell-crank lever projects through a slot 107 in the dash and is pivotally connected as at 108 to a link 109. The other end of this link is pivotally connected as at 110 to the stem 79 of the piston valve 73. The arm 104 of the lever 101 is preferably longer than the other arm 106 thereof in any suitable ratio such that movements of the slide 94 will not cause more than the total permissible travel of the piston valve 73 in the chamber 68.

The operation of this device will be apparent from the foregoing description. In starting from cold the handle 95 is pulled out by the operator so as to open the choke valve and increase the richness of the fuel mixture, and at the same time this operates the piston valve 73, through the connections described, to admit oil under pressure from the engine lubricating system to the oil manifold 60 and thence through the conduits 40 to the cylinder walls.

As soon as the engine has started and is running smoothly, the operator closes the choke valve 87 by pushing in the handle 95, and this movement, through the connecting linkage described, raises the piston valve 73 to cut off the supply of oil through the pipe 28 and to connect the rectifier pipe 38 to the manifold 60.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. The combination with an internal combustion engine having a manually operated choke to vary the quality of the fuel mixture for starting, of a pressure lubricating system, an oil rectifier operated by engine suction, a conduit leading to the cylinder wall, and control means operated by the choke to connect either the lubricating system or the rectifier to said conduit.

2. The combination in an internal combustion engine having manually operated means to assist in starting the engine, of an oil pressure system, an oil suction system, and valve means connected to said manually operated means to connect either the pressure system or the suction system to the cylinder wall of the engine.

3. The combination in an internal combustion engine of a pressure oil circulating system, vacuum operated purifying means for the oil of said system, an oil manifold connected to the cylinder wall, and valve means manually operated to connect either the pressure oil system or the purifying means to said manifold.

4. The combination in an internal combustion engine of a pressure oil circulating system, vacuum operated purifying means for the oil of said system, a valve housing, a manifold connected to the cylinder wall and to the housing, and a manually operated valve in said housing to connect either the pressure system or the vacuum system to the manifold and to discharge leakage from the pressure system into the purifying means.

5. In an internal combustion engine, the combination of an oil rectifier, means connecting said rectifier to the cylinder wall, a choke valve for starting the engine, and valve means in the cylinder wall connection connected to and operated from the choke valve to shut off said rectifier while the engine is being started.

6. The combination with an internal combustion engine having a pressure lubricating system, of an oil suction means normally connected to the engine cylinder wall, manually operated means for starting the engine, and means connected for operation with said starting means to disconnect the suction means and to connect the lubricating system to the cylinder wall.

7. The combination in an internal combustion engine having a starting device, of an oil manifold having passages extending to the cylinder walls of the engine, a suction means, an oil pressure system, and a valve device operated from the starting device to connect either the suction means or the pressure system to said manifold.

8. The combination with an internal combustion engine having a cylinder and a pressure lubricating system, of manually operated starting means for the engine, and means controlled from the starting means and connected to said system to supply lubricant to or remove lubricant from the cylinder wall.

9. The combination with an internal combustion engine having a pressure lubricating system and a suction operated oil rectifier, of a manually operated starting device, and means to connect the lubricating system to the engine cylinder wall during starting and the rectifier to the cylinder wall during running of the engine, said means comprising a control vlave connected to and operable with the starting device.

10. The combination with an internal combustion engine having a cylinder, of a passage to said cylinder wall, and means including a manually operable valve to supply lubricant to or remove lubricant from the cylinder wall through said passage.

11. The combination with an internal combustion engine having cylinders and a manually operated device to assist starting of the engine, of an oil manifold having connections to each cylinder wall, an oil pressure means, an oil suction means, and valve means connected to and operable with said starting device to connect the pressure means to the manifold during starting and the suction means to the manifold during running of the engine.

12. The combination with an internal combustion engine having a cylinder, of oil pressure means, oil suction means, and a valve device operable to selectively connect said pressure means and said suction means to the cylinder wall, said valve having a leakage chamber and means to connect said chamber to the suction means.

13. The combination with an internal combustion engine having cylinders and a lubricating system, of a suction operated purifying device for said system, an oil manifold having passages to each cylinder wall, valve means adapted to connect the manifold either to the lubricating system or to the purifying device, and drainage means for said valve means connected to the purifying device.

In testimony whereof I affix my signature.

ALFRED MOORHOUSE.